Nov. 22, 1960  F. A. HILL 2ND  2,960,884
ROUNDED TOOTH TIPS FOR POINTED ROTOID TEETH
Filed Nov. 30, 1954  2 Sheets-Sheet 1
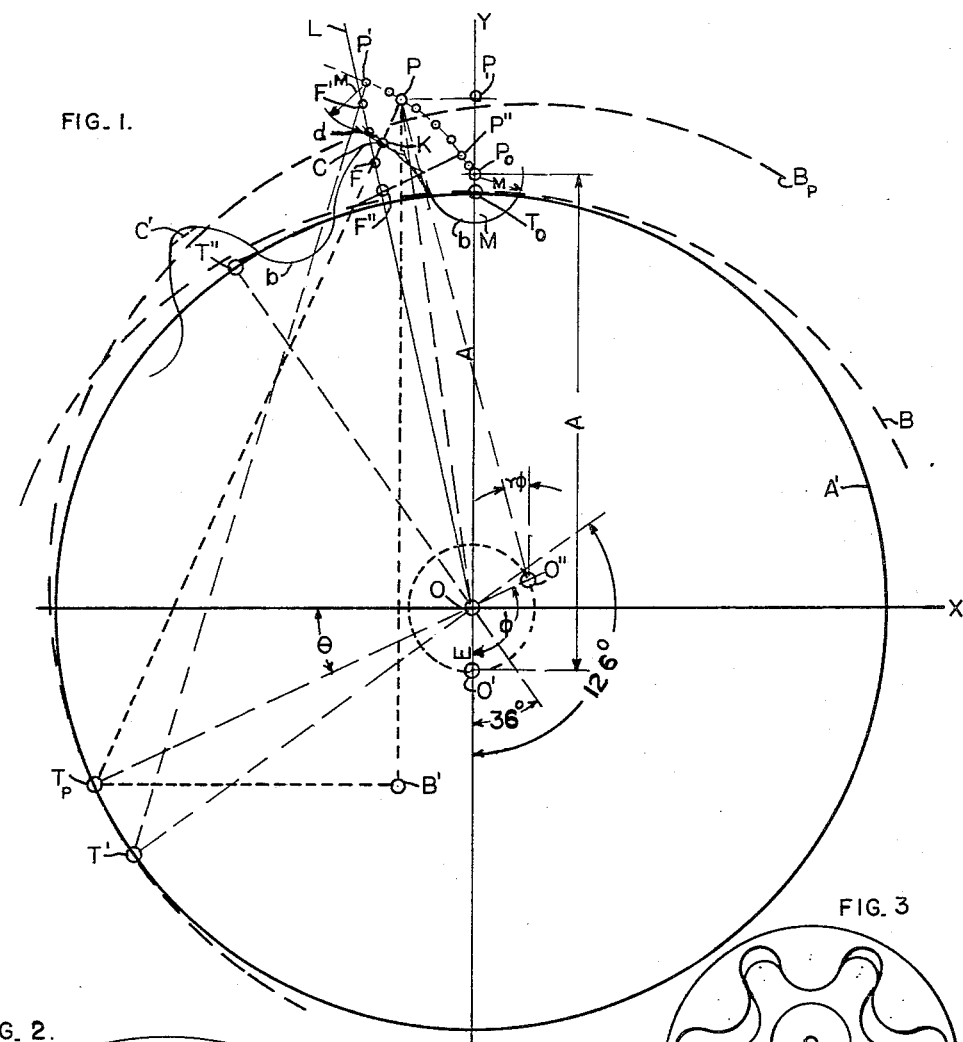
FIG. 1.
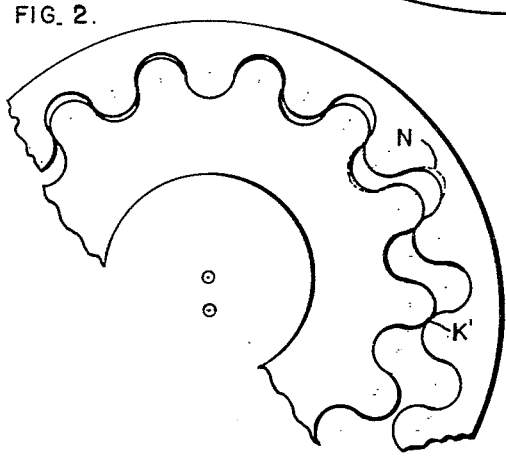
FIG. 2.
FIG. 3
FRANCIS A. HILL, 2ND.
INVENTOR
By
Gustav H. Emery
Atty Nov. 22, 1960     F. A. HILL 2ND     2,960,884
ROUNDED TOOTH TIPS FOR POINTED ROTOID TEETH
Filed Nov. 30, 1954     2 Sheets-Sheet 2

FRANCIS A. HILL
INVENTOR
BY
YOUNG, EMERY &
THOMPSON
ATTORNEYS

United States Patent Office 2,960,884
Patented Nov. 22, 1960

2,960,884
ROUNDED TOOTH TIPS FOR POINTED ROTOID TEETH

Francis A. Hill 2nd, Westport, Conn., assignor to Hill Enterprises, Inc.

Filed Nov. 30, 1954, Ser. No. 471,969

10 Claims. (Cl. 74—462)

My invention relates to rotoids and includes matter shown and described in Patents Nos. 2,389,728, 2,547,392, 2,578,187, 2,601,288, 2,601,397, 266,336 combined with new matter and is a continuation-in-part of my application Serial No. 359,487, filed June 4, 1953, now abandoned.

In these earlier patents on gears having continuous fluid tight contacts between the teeth at steady angular speeds thruout the range of tooth engagements between open and full mesh either the inner gear had rounded teeth and the outer gear had pointed teeth with sharp tips, or the outer gear had rounded teeth and the inner gear had pointed teeth.

Rounded tooth tips in place of pointed teeth are desirable. They do not require pointed tools which wear away quickly. If one gear is ground to size during generation the sharp edge on the grinding wheel (representing a pointed tooth on the other gear) wears away and the wheel has to be dressed too frequently for economic production. When either gear is made of sintered metal the forming dies wear away at the sharp edges. If the die has sharp cusps it is difficult to extract the sintered blank from the die without losing the sharp tips on the teeth. Also sharp teeth are difficult to handle during manufacture and are easily damaged.

One of the objects of my invention is to provide tooth tips having rounded curvatures in place of tooth tips having sharp points or edges on the teeth of the inner or pinion gear, or on the outer gear, or on both gears.

Another object of my invention is to have the contours of the rounded tooth tips so located as to merge smoothly in side elevation into the curvatures of the flanks of the teeth and to use said tips to generate the tooth spaces of the mating gear so that the contours of the latter will merge smoothly in side elevation into the curves of the flanks of the teeth of said mating gear.

A third object of my invention is to design gears which can be made with the least wear on the tools.

A fourth object of my invention is the use of curves on the teeth that facilitate the mathematical location where the teeth of one gear part company from those of the other gear or start to engage the teeth of the other gear at the ends of the crescent space at open mesh.

In the figures:

Fig. 1 is a geometric layout of an outer rotor tooth form generating a pinion tooth and tooth space and the geometry for replacing the pointed tip on the pinion tooth with a rounded tip.

Fig. 2 shows parts of a 13 tooth pinion inside part of a 15 toothed outer gear with rounded tipped teeth and rounded tooth spaces on both gears.

Fig. 3 shows a pair of 5 x 7 gears with rounded tipped teeth and rounded tooth spaces on both gears.

Figure 4:
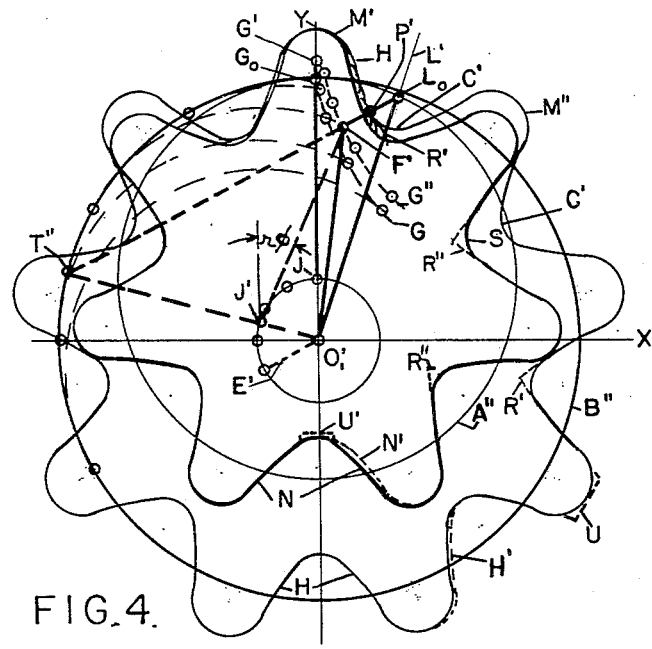
Fig. 4 shows a geometric layout of a pair of 7 x 9 toothed gears with a circular pinion tooth generating the space curve and flanks of the outer gear and the geometry for replacing the pointed tip on the outer gear tooth with a circular tip.

In Fig. 1 are shown two ratio circles $A'$ and $B$. Circle $A'$ with a radius equal to $6\frac{1}{2}$ times the eccentricity $OO'$ is in this instance the ratio circle of a 13 tooth pinion gear whose center is at $O$. The outer rotor ratio circle $B$ with a radius $7\frac{1}{2}$ times the eccentricity $OO'$ is shown when $B$ is tangent to $A'$ at the point $T_o$. Also $B$ is shown in the position $B_p$ when tangent to $A'$ at $T_p$. The outer rotor has 15 teeth.

The circroidal addition is shown from $T_o$ to $P_o$.

For the purpose of mathematical computation let the $x$ and $y$ axes intersect at $O$, the center of the pinion gear.

In order to generate a pinion tooth of a 13 tooth inner or pinion gear according to the Hill theorem (see Patent No. 2,666,336) the circle $B$ rolls without slipping counter clockwise on $A'$ and as it does so the eccentric arm $E$ (equal to $OO'$) will swing counter clockwise to some point such as $O''$. The point of tangency between $A'$ and $B$ will swing from $T_o$ to $T_p$. While this is taking place the radicroid $A$ (which is the length of the radius of $B$ or $O'T_o$ plus circroidal addition $T_oP_o$) will be swung to the left and its travelling center $O'$ moves up to $O''$. If the angular swing of the eccentric arm $E$ is $\phi$ degrees, then the angular swing of the radicroid $A$ from its starting position $O'P_o$ to $O''P$ will equal $r\phi$ where $r$ equals $$\frac{15-13}{15}$$

or $2/15\phi$.

As the circle $B$ rolls on $A'$ counter clockwise from the point $T_o$ on the $Y$ axis to the point of tangency at $T_p$, the outer end of the radicroid $A$ passes thru or outlines the points on the epicircroid $P_oP'$. Also it is a well known geometrical fact that any line connecting a point in the circroid with its corresponding point of tangency between $A'$ and $B$ is perpendicular to the circroid at that point. At the point $P$ this perpendicular extends from $P$ to $T_p$.

The equations for the circroid with axes passing thru the pinion gear center $O$ are:

(1)
$$\left. \begin{array}{l} x = E \sin \phi - A \sin r\phi \\ y = A \cos r\phi - E \cos \phi \end{array} \right\} \text{where } \phi \text{ varies from } 0° \text{ to } 90°$$

(2)
$$x = E \cos(\phi - 90°) - A \sin r\phi$$
$$y = E \sin(\phi - 90°) + A \cos r\phi$$
where $\phi$ is greater than 90° where $E$=eccentricity; $A$=length of radicroid $O'P_0$; $r=2/15$; and $\phi$=angular swing in degrees of the eccentric arm $E$ with relation to the $y$ axis.

If the outer gear tooth form is of the simplest type (a circular arc of a single fixed radius), and if we want to put a circular arc (not necessarily the same size) inside the pointed tip $d$ of the pinion tooth with its center on the pinion tooth center line LO, it is necessary to find the distance from P to the pinion tooth surface at K and the distance from K to the center of the proposed circular tooth tip at F. To do this we have to find all the angles and the lengths of the side of the obtuse triangle FPO. By construction FP lies along and coincides with PT$_p$. FP is perpendicular to the circroid P$_o$P' at P and to the surface of the pinion tooth at K. In order to have a pinion tooth tip both circular in shape and at the same time have its curvature merge smoothly with the generated pinion tooth curve at K its center F has to be on some part of the line PT$_p$. By locating the point F on LO (the center line of the pinion tooth) a tooth tip having the same shape on each side of LO can be realized.

If we assume $E=.478''$; $A=3.704''$; $m=.390''$ (radius of the outer gear tooth circular generating form M whose center travels along the epicircroid P$_o$P') by using Equations 1 and 2 we get the following $x$ and $y$ values for the different points on the circroid P$_o$P'.

| $\phi°$ | $r\phi°$ | $x''$ | $y''$ |
|---|---|---|---|
| 0 | 0 | 0 | 3.226 |
| 36 | 4.8 | −0.028 | 3.304 |
| 54 | 7.2 | −0.0776 | 3.394 |
| 72 | 9.6 | −0.1630 | 3.504 |
| 90 | 12.0 | −0.2922 | 3.624 |
| 108 | 14.4 | −0.4664 | 3.736 |
| 117 | 15.6 | −0.5708 | 3.784 |
| 126 | 16.8 | −0.6820 | 3.822 |

The point P should not be too close to either end of the epicircroid P$_o$P' in Fig. 1. For instance, if P' is selected, the perpendicular to the epicroid from P' to its corresponding point of tangency T' between A' and B intersects the tooth center line LO at F' outside of the tooth curve $db$ and is obviously impractical. On the other hand, if P'' is selected for a point P too close to P$_o$, its perpendicular P''T'' will intersect the center line LO at F''. A tooth tip C' centered at F'' will result in a much shorter tooth. The range of tooth contacts will be unnecessarily shortened and the chambers between the teeth will be shallower. In gears used in fluid displacement mechanisms the capacity would be unnecessarily reduced.

In Fig. 1 I have selected the point P where the $x$ and $y$ values are .5708 and 3.784 respectively.

In triangle FPO, $PO = \sqrt{x^2 + y^2} = 3.825''$
Tangent of angle $POP_1 = x/y$ and angle $POP_1 = 8.573°$
For ½ a tooth division of the 13 toothed pinion angle $$FOP_1 = \frac{360°}{2 \times 13} = 13.846°$$

Angle $FOP$=angle $FOP_1$−angle $POP_1 = 5.273°$
By construction angle $FPO$=angle $T_pPO$.

The radius $OT_p$ of the 13 toothed pinion ratio circle A' is $6.5 \times E$ or $OT_p = 6.5 \times .478 = 3.107''$ and angle $\theta = \phi - 90° = 117 - 90 = 27°$.

Draw lines thru P parallel to the $y$ axis and thru $T_p$ parallel to the $x$ axis respectively meeting at B'. The $x$ and $y$ values for point $T_p$ are: $x = -OT_p \cos \theta = -2.769''$; $y = -OT_p \sin \theta = -1.411''$.

In triangle $T_p$PB', side $T_pB' = 2.769 - .5708 = 2.198''$ and the side $PB' = 3.784 + 1.411 = 5.195''$.

By construction angle $T_bPB'$=angle $FPB'$ and tangent angle $T_pPB'$ equals $$\frac{2.198}{5.195}$$

$$\therefore \angle FPB' = 22.93°$$

In triangle FPO, angle $FPO$=angle $FPB'$+angle $B'PO$ $= 22.93° + 8.573° = 31.503°$.

Next find the lengths of the two remaining sides FP and FO and the angles FOP and OFP in the triangle FPO.

Angle $FOP$=angle $FOP_1$−angle $POP_1 = 13.846° - 8.573°$ $= 5.273°$.

We now have one side and all three angles of triangle FPO.

$$\therefore FP = \frac{OP \sin \angle FOP}{\cos(\angle OFP - 90°)}$$

$$= .587'' \text{ and } OF = \frac{OP \sin \angle FPO}{\cos(\angle OFP - 90°)} = 3.339''$$

We know the distance from P to K is the radius $m$ of the tooth of the outer gear. Assume $m$ to equal .390''.
Then $FK = FP - m = .587'' - .390'' = .197''$ which is the radius of the circular tip for the pinion tooth.
The radius OC of the pinion tooth is $OF + FK = 3.536''$.
The radius to the bottom of the pinion tooth space $$OB = A - m - E = 2.836''$$

We now have all the data necessary to make a pinion gear. We can take a blank, set it in the generating machine, place a cutter or grinding wheel with a convex curve whose radius is $m$ and generate the pinion curve from $b$ to the pointed tip $d$ (on both flanks of the tooth). Then we can take a cutter or grinding wheel with a concave curve radius equal to FK, center it on the tooth center line at a distance OC from the center of the gear to the center of the concave curve and cut the rounded tip of the pinion tooth and know that it will merge smoothly into the generated tooth flanks of the pinion by using the above dimensions.

Flatter tooth tips may be used as indicated at C' in Fig. 1. But they should be merbed into the generated banks at K by suitable curves connecting the ends of the flatter tips with said flanks. To prevent undue wear sharp corners should be avoided.

Fig. 4 shows the geometric layout of a 7 tooth pinion gear in which the circular tooth M' generates the tooth spaces M'' and tooth flanks H of a 9 tooth outer gear. In this case the hypocycloid G$_o$G is traced by the point G$_o$ on the circumference of the pinion gear ratio circle A'' as it rolls to the left inside the outer gear ratio circle B''. The circroidal addition is G$_o$G' and the radicroid is JG'. The point G' on JG' will trace the hypocroid G'G''. The outer gear tooth center line is L'O'$_1$. A circular tooth tip M' will outline or trace the outer rotor space curve M'' and flanks H while its center travels along the hypocircroid G$_o$G''. M' will form a pointed outer rotor tooth tip at R'. For the purposes of mathematical calculation let the $x$ and $y$ axes pass thru the outer rotor center at O'$_1$. Select some point such as F' on G'G'' and connect it to the corresponding point of tangency T'' and extend F'T'' to the outer rotor tooth center line at L$_o$. Connect F' to the center of the outer rotor at O'$_1$. The triangle F'O'$_1$L$_o$ is like the triangle FOP in Fig. 1 and can be solved in a like manner in order to get the radius P'L$_o$ for a circular tooth tip on the outer gear.

When circular tooth tips are substituted for pointed tooth tips on one gear they have no generative relation with the circular tooth tips on the other gear. In Fig. 1 the circular tooth tip C has no generative relation to the flanks of the teeth of the outer gear. In has nothing to do with the fluid tight contacts between the teeth of the gears. When the bottoms of the tooth spaces of the mating gear are undercut as at U and U' in Fig. 4 these substituted circular or rounded tooth tips never touch the teeth and tooth spaces of the mating gear. When there are no undercuts these circular or rounded tips have a generative relation with the concave curves at the bottom of the tooth spaces.

If backlash is desired either the pinion blank or the outer gear blank may be rotated slightly on its axis so as to cut the tooth flanks shown in Fig. 4 at H' and N'. The space curves may be undercut as shown at U and U'.

Figure 5:
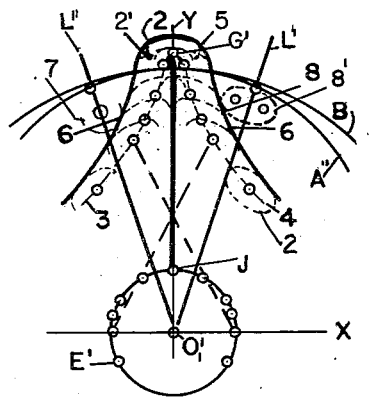
Fig. 5 shows part of Fig. 4 with an elliptical pinion tooth form generating 2 half pointed teeth on the outer gear and a circular form to replace one pointed tip and an elliptical form to replace the other pointed tip.

The two hypocircroids 3 and 4 in Fig. 5 are like G'G" in Fig. 4. In this Figure 5 the pinion ratio circle A" rolls first to the left and then to the right inside of B" with the radicroid JG' carrying an elliptical tooth 2 which will generate a pointed outer gear tooth 6 and space curve 5 and its flanks 8. On the left hand outer gear tooth center line L"O'$_1$ is shown an outer gear circular tip 7 and on the right hand outer gear center line LO'$_1$ is shown an elliptical outer gear tooth tip 8'. This is for the purpose of showing different rounded curves may be substituted in place of the pointed tooth tips.

Figure 6:
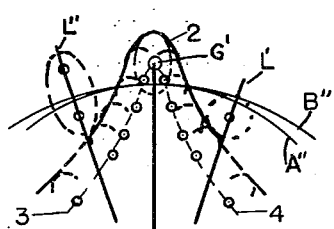
Fig. 6 shows a pinion tooth elliptical curve at right angles to the one in Fig. 5 generating pointed teeth on the outer gear and a circular curve to replace one pointed tip and an elliptical curve to replace the other pointed tip.

Fig. 6 shows part of Figure 5 with an elliptical form at right angles to the one in the latter figure. In these Figures 5 and 6 it is necessary to make the normal to the ellipse coincide with the line F'L$_o$ in Fig. 4. But the solution for the triangle F'O'$_1$L$_o$ is similar in other respects. The circular tip is easier to calculate because its radius is normal to the curve at P'.

Figures 7, 13:
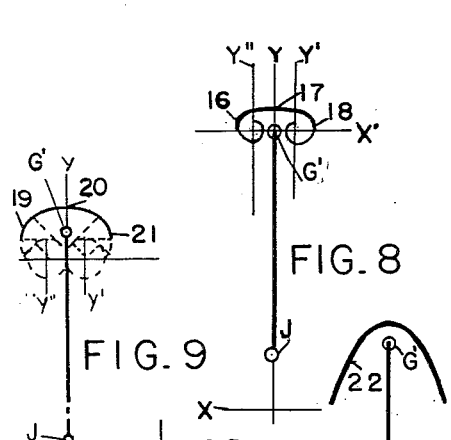
Fig. 7 shows a cycloidal tooth tip to replace a pointed tip.
Fig. 13 shows the epicircroid in Fig. 1 with an elliptical tooth tip on the outer gear for generating the pointed teeth of the inner gear and a circular tip replacing the pointed tip on the inner gear.

Figure 7 shows the radicroid JG' with a cycloidal tooth tip 12—13—14. The circle 9 may be centered on JG' at 10. A smaller circle W may be rolled on 9 as shown and a point on its circumference will trace the cycloid 11—12—13—14—15. That part of the cycloid from 11 to 12 and from 14 to 15 is omitted for generation purposes because the radius of the cycloid at 11 and 15 is zero and grows to a finite length at the points 12 and 14. This finite length will be the minimum radius of curvature of the tooth tip.

The reason the whole epicycloid 11—12—13—14—15 is not used is because the whole curve can not be made or manufactured. At 11 and at 15 the radius of curvature is zero. Any cutter having any radius of curvature can not cut a curve having zero radius. It is easy to draw a hypocycloid inside a pitch circle and join it with an epicycloid on the outside of the same pitch circle, and so design a gear having epicycloidal teeth and hypocycloidal tooth spaces. Just where these two curves join together across the pitch circle or rather on the pitch circle they have zero radius. Consequently a cutter having a radius of ½" for example can not cut that part of either cycloid inside or outside of the pitch circle which has a radius of curvature less than this ½". In the machine shop the practice has been to join part of one cycloid with part of the other cycloid by a generated curve. Consequently the teeth and tooth spaces can never be pure hypo and epicycloids. They are compound or mongrel curves which must be generated as in Figs. 1 or 4.

Figures 8, 9:
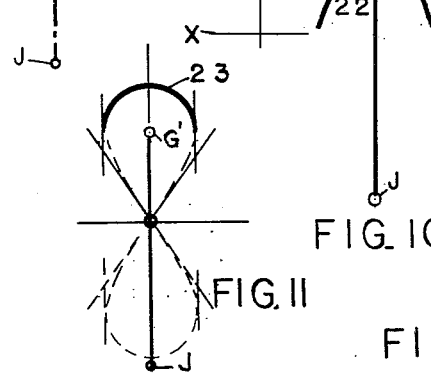
Fig. 8 shows a pinion tooth tip composed of two merging spirals to replace a pointed tip.
Fig. 9 shows how two involute curves can be combined to form a rounded tooth tip to replace a pointed tip.

Fig. 8 shows how parts of two spirals 16—17 and 17—18 may be joined together to form a tooth tip. For a symmetrical tooth tip the normals to the spirals at the point 17 should lie along the radicroid JG'.

Figure 9 shows how two involute curves 19—20 and 20—21 may be joined together to form a tooth tip. Of course these involute curves have nothing to do with the ratio circles. They must be so placed on the radicroid JG' that they obey the laws of the Hill theorem (see Patent No. 2,666,336).

Figures 10, 11, 12:
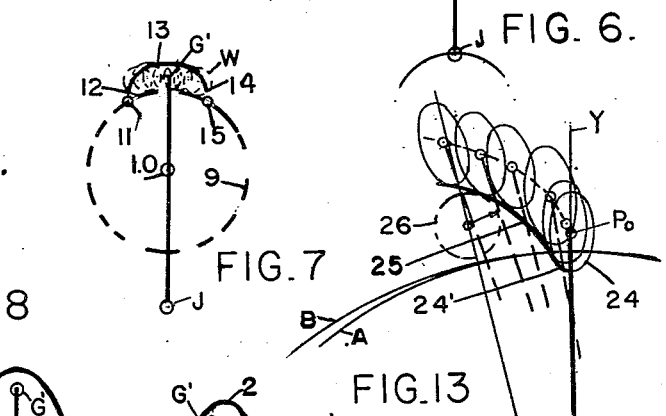
Fig. 10 shows a tooth tip shaped like part of a caternary, hyperbola or parabola to replace a pointed tip.
Fig. 11 shows a tooth tip shaped like part of a lemniscate to replace a pointed tooth tip.
Fig. 12 shows parts of Figs. 4 and 5 with an elliptical tooth tip form mounted at an angle to the tooth center line and generating unsymmetrical pointed teeth and tooth spaces on an outer gear with circular curves to replace the pointed tips.

Fig. 10 shows a tooth tip curve 22 which may be part of a parabola or part of a hyperbola or part of a catenary.

Fig. 11 shows that part 23 of a lemniscate which may be used for a tooth tip.

In Fig. 12 the ellipse 2 in Fig. 6 tilted at an angle to the radicroid JG'. In this case the teeth and tooth spaces of both gears will be unsymmetrical.

Fig. 13 shows the epicircroid in Fig. 1 with an elliptical outer rotor tooth tip 24 for generating a pinion tooth space and tooth flanks 25. A circle 26 may be used for the pinion tooth tip. Any of these curves in Figures 6 to 11 inclusive may be used in place of the elliptical tooth tip in Fig. 13 provided they follow the laws of the circroidal addition of the Hill theorem.

The curves in Figs. 5, 7, 8 and 9 are very similar in appearance. In small gears it is almost impossible to tell by eye which particular curve is used for a tooth tip on either one of the gears. A tooth tip in Fig. 10 could be made to closely resemble the curve 24 in Fig. 13, and a tooth tip 23 in Fig. 11 closely resembles the curves of the tips in Fig. 4.

In the drawings the circular and noncircular or rounded tooth tips have been enlarged to show their geometric character. In practice these tips vary in width with the numbers of teeth and the sizes of the gears. When an outer gear is 1 inch in diameter the radius of a circular tip may be 1/32 of an inch. If the tip is cycloidal as in Fig. 7 the distance from 12 to 14 may be 1/16 of an inch. When the outer gear is 6 inches in diameter that radius of a circular tip may be 3/16 of an inch. In all cases the substituted rounded tip has to lie radially inside of the generated pointed tip of the pinion tooth and radially outside of the generated pointed tip of a tooth of the outer gear, depending upon which gear contains the master tooth form for generating. This is to avoid interference between the teeth.

Other curves may be used and other combinations of curves may be used. No matter what curve or what combinations of curves may be adopted for a tooth tip on either gear, they have to conform to the Hill theorem (see Patent No. 2,666,336) during generation. The teeth on one gear must maintain continuous fluid tight contacts with the teeth of the other gear thruout the driving or driven range of tooth contacts at steady angular velocity.

It will be noted in Fig. 1 that the top of the tooth C is inside that of the pointed tooth tip. This cuts down the capacity of the displacement chambers between the gears. This can be overcome by increasing the eccentricity between the gear centers a corresponding amount and modifying other factors to suit.

Consistent with good tool design, the rounded tooth tip should be as small as possible. This is for the purpose of making the range of tooth contact as long as possible from full mesh to open mesh. The contact marked K' in Fig. 2 shows where the gears in Fig. 1 start to part company.

Broadly my invention consists in making rotoid gears with rounded tooth tips and tooth spaces on both gears so that strong sturdy tools may be used in manufacture. But whatever curves are selected, the tips of the teeth have to conform to the Hill theorem in order to avoid tooth interference (see Patent No. 2,666,336).

What I claim is:

1. In a rotary gear mechanism, one gear inside of and eccentric to the other, the numbers of teeth of said gears based on a fractional ratio differing by one, the tips of the teeth of one of said gears being flat with rounded shoulders merging smoothly into the flank contours of said teeth, said teeth meshing with each other and maintaining continuous fluid tight contacts during the performance of pressure functions from the region of full mesh to the region at open mesh at the ends of the range of no tooth contacts, said tips having a generative relation with the space contours between the teeth of said other gear, and said space contours having rounded shoulders merging smoothly in side elevation into the contours of the flanks of said teeth of said other gear.

2. The combination according to claim 1, and having radial clearance between the top of a tooth and the bottom of a tooth space at full mesh.

3. The combination according to claim 1, and having teeth and tooth space contours angularly side stepped to provide backlash.

4. In a rotary mechanism, a pair of gears, one inside the other with their numbers of teeth differing by a ratio having a fractional difference of one, said pair consisting of a first gear and a second gear, said first gear having tooth contours maintaining continuous fluid tight contacts with the flanks of the teeth and the tooth space contours of said second gear as they open or close chambers during the performance of pressure functions, tips of the teeth of said second gear having rounded curves in side elevation merging smoothly into the contours of said flanks and having no contacts with the rounded tooth contours of said first gear, said tips maintaining continuous fluid tight engagements with the tooth space contours of said first gear in the region of full mesh tooth engagement, said tooth space contours of said first gear merging smoothly in side elevation with the rounded contours of the teeth of said first gear, and having the contours of the flanks of the teeth and of the tooth spaces of said second gear outlined or generated by a form representing a rounded tooth of said first gear carried at the end of the extended radius of the ratio circle of said first gear as it rolls in or on the ratio circle of said second gear, and having the length of said extended radius sufficient to maintain continuous fluid tight contacts at steady angular speeds.

5. The combination according to claim 4, and having the contour of said tips circular.

6. The combination according to claim 4, and having the contour of said tips cycloidal in shape.

7. The combination according to claim 4, and having the generated tooth spaces of either one or both gears undercut to provide clearance at full mesh.

8. The combination according to claim 4, and having the contours of the teeth and tooth spaces side stepped to provide backlash.

9. In a rotary mechanism according to claim 4, in which said contours of said tips are shaped to curves having variable radii.

10. The combination according to claim 4, in which the contours of said teeth and tooth spaces are unsymmetrical in side elevation.

References Cited in the file of this patent

UNITED STATES PATENTS

| | | |
|---|---|---|
| 1,538,328 | Holdener | May 19, 1925 |
| 1,682,563 | Hill | Aug. 28, 1928 |
| 2,031,888 | Hill | Feb. 25, 1936 |
| 2,091,317 | Hill | Aug. 31, 1937 |
| 2,209,201 | Hill | July 23, 1940 |
| 2,222,515 | Pigott | Nov. 19, 1940 |
| 2,389,728 | Hill | Nov. 27, 1945 |
| 2,578,187 | Hill et al. | Dec. 11, 1951 |
| 2,666,336 | Hill et al. | Jan. 19, 1954 |

FOREIGN PATENTS

| | | |
|---|---|---|
| 9,359 | Great Britain | June 25, 1915 |
| 993,181 | France | July 18, 1951 |

UNITED STATES PATENT OFFICE

CERTIFICATION OF CORRECTION

Patent No. 2,960,884  
November 22, 1960

Francis A. Hill 2nd.

It is hereby certified that error appears in the above numbered patent requiring correction and that the said Letters Patent should read as corrected below.

Column 4, line 42, for "merbed" read -- merged --; line 43, for "banks" read -- flanks --.

Signed and sealed this 9th day of May 1961.

(SEAL)  
Attest:

ERNEST W. SWIDER  
Attesting Officer

DAVID L. LADD  
Commissioner of Patents